3,342,809
**PROCESS FOR PREPARING LACTAMS AND POLY-
AMIDES FROM LACTONES AND AMINES**
David Harold Johnson, Manchester, England, assignor to Imperial Chemical Industries Limited, London, England, a corporation of Great Britain
No Drawing. Filed Feb. 26, 1965, Ser. No. 435,743
Claims priority, application Great Britain, Mar. 4, 1964, 9,199/64
8 Claims. (Cl. 260—239.3)

This invention relates to a process for the manufacture of lactams and the corresponding polyamides.

According to the present invention we provide a process for the manufacture of mixtures of lactams with the corresponding polyamides by reacting a lactone containing from 4 to 8 carbon atoms with ammonia or an amine in presence of hydrogen and a hydrogenation catalyst at elevated pressure and temperature characterised in that at least 15 molecular proportions of ammonia or an amine are present during the reaction for each molecular proportion of lactone.

It has been found that by operating in presence of a large excess of ammonia or an amine at high pressures and temperatures good yields of lactams and their corresponding polyamides are obtained. Preferred conditions for operating the process are—

Total pressure from 50 to 1000 atmospheres,
Temperature from 200° to 350° C. and preferably from 215° to 250° C.,
Molar ratio of lactone to ammonia or amine from 1:15 to 1:250.

The lactones employed in the process of the invention contain from 4 to 8 carbon atoms; all of the carbon atoms may form part of the lactone ring or some of the carbon atoms may be present as alkyl substituents on the lactone ring. Suitable lactones are for example butyrolactone, valerolactone, caprolactone, methyl caprolactone and dimethyl caprolactone. Preferably the lactones employed in the process of the invention are the $\omega$-lactones.

Although it is preferred to employ ammonia in the process of the invention an amine, preferably an aliphatic amine, a cycloaliphatic amine, an aromatic amine, or arylalkylamine containing from 1 to 8 carbon atoms may be employed, for example methylamine, ethylamine, n-propylamine, isopropylamine, n-butylamine, iso-butylamine, sec-butylamine, n-pentylamine, n-hexylamine, cyclopentylamine, cyclohexylamine, aniline, toluidines or benzylamine.

When amines are employed in the process of the invention the derived lactams and polyamides contain a substituent on the nitrogen atom derived from the amine.

By using at least 15 molecular proportions of ammonia or an amine in the process of the invention it is found that the formation of lactam rather than the corresponding polyamide is favoured.

Hydrogen is preferably employed in an amount of from 0.1 to 3 moles for each mol of ammonia.

Suitable hydrogenation catalysts are any of those commonly employed in the hydrogenation of organic compounds such as Raney nickel, nickel-on-kieselguhr, cobalt-on-kieselguhr, palladium-on-carbon or platinum oxide. The catalysts are usually employed in an amount of 0.05 part to 0.35 part per part of lactone.

The product obtained by the process of the invention is a mixture containing a lactam and the corresponding polyamide, and may be worked up for example by fractional distillation to separate the lactam from the polyamide. The amino acid corresponding to the lactam may be recovered from the polyamide by hydrolysis for example with aqueous mineral acids, such as hydrochloric acid, and separation of the acid from the hydrolysis product by evaporation. The residue obtained by evaporation may be purified by dissolving it in water and contacting the solution with an ion exchange resin. The acid may then be recovered by elution with water from the ion exchange resin. Suitable ion exchange resins are for example those of the basic type containing quaternary ammonium groups.

The invention is illustrated by the following examples:

*Example 1*

75 parts of $\epsilon$-caprolactone, 67 parts of anhydrous ammonia, and 16 parts of Raney nickel catalyst are charged to a stainless steel autoclave, to which hydrogen is admitted at room temperature until the total pressure of ammonia and hydrogen is 90 atmospheres. The temperature of the agitated reaction mixture then is raised to ca. 225° C. and maintained at this level for 8 hours when a maximum pressure of 190 atmospheres is developed. When the autoclave is cooled to room temperature, the final total pressure is found to be 79 atmospheres, corresponding to a hydrogen absorption of 0.94 mole per mole of caprolactone charged; it is then vented to atmosphere and, if required, unreacted ammonia may be recovered for re-use by condensation. The resulting residue is distilled under reduced pressure to give 3 fractions—

(1) 8.7 parts of material B.P. 20–56° C./48 mm., a colourless oil,
(2) 1.16 parts of material B.P. 130–140° C./17 mm., a colourless oil which partly crystallises on keeping,
(3) 4.08 parts of material B.P. 140–144° C./17 mm., a colourless oil which crystallises on cooling; a pale green-coloured waxy distillation residue (59.15 parts) remains.

Fraction 1 is largely water containing small amounts of hexamethylene diamine, hexamethylene imine and traces of other aliphatic bases.

Fraction 2 is a mixture of hexamethylene diamine and $\epsilon$-caprolactam.

Fraction 3 is $\epsilon$-caprolactam, M.P. 53–55° C.

22.4 parts of the distillation residue, essentially low molecular weight polycaprolactam, are hydrolysed for 7 hours with 1000 parts of boiling 5 N hydrochloric acid and the pale yellow solution evaporated to dryness to remove excess hydrogen chloride. A solution of the crystalline residue in 500 parts of deionised water is allowed to drip slowly through a column consisting of 300 parts of Amberlite IR–45 resin (OH⁻ form), and the residue then washed with deionised water until a total of 1500 parts of aqueous eluate has been collected. These aqueous liquors are evaporated at atmospheric pressure to a bulk of ca. 200 parts, and finally taken to dryness under reduced pressure. The semi-crystalline colourless residue is shaken with 120 parts of hot ethanol, cooled to room temperature and 215 parts of ether are added. After keeping at 0° C. for 10 minutes, 16.8 parts of 6-aminocaproic acid, M.P. 192–193° C. (benzoyl derivative M.P. 76–78° C.) are removed by filtration, washed with 50 parts of ether, and dried in vacuo.

*Example 2*

The procedure of Example 1 is repeated with the following quantities of reactants: 75 parts of $\epsilon$-caprolactone, 300 parts of anhydrous ammonia, 16 parts of Raney nickel catalyst, and a total initial ammonia plus hydrogen pressure of 98 atmospheres. The heating period is 6 hours at 225° C. and the maximum pressure developed is 380 atmospheres. The final pressure of 85 atmospheres in the cooled autoclave corresponds to a hydrogen absorption of 0.90 mole per mole of caprolactone. The reaction product is removed from the autoclave with the aid of hot methanol, catalyst filtered off and solvent evaporated. Distillation of the viscous residue affords 3 fractions—

(1) 1.87 parts of material B.P. 29° C./26 mm.–40° C./20 mm., a colourless oil, (2) 6.88 parts of material B.P. 115–143° C. / 16 mm., a colourless oil which partly crystallises on keeping, (3) 17.30 parts of material B.P. 143–149° C./16 mm., a colourless oil which crystallises on cooling; a pale green coloured viscous oily distillation residue (45.22 parts) remains.

Fraction 1 is largely water containing small amounts of hexamethylene diamine and hexamethylene imine.

Fraction 2 is a mixture of hexamethylene diamine and $\epsilon$-caprolactam.

Fraction 3 is caprolactam, M.P. 58–61° C.

Hydrolysis of 22.51 parts of the distillation residue of low molecular weight caprolactam with 1000 parts of boiling 5 N hydrochloric acid, followed by treatment of the hydrolysate with Amberlite IR–45 resin (OH⁻ form) and subsequent work-up as detailed in Example 1, gave 13.6 parts of 6-aminocaproic acid, M.P. 190–193° C. (benzoyl derivative M.P. 76–78° C.).

*Example 3*

The procedure of Example 1 is repeated with the following quantities of reactants. 25 parts of $\epsilon$-caprolactone, 300 parts of anhydrous ammonia, 6 parts of Raney nickel catalyst, and a total initial ammonia+hydrogen pressure of 95 atmospheres. The heating period is 11.5 hours at 225° C. and the maximum pressure developed is 388 atmospheres. The final pressure of 90 atmospheres in the cooled autoclave corresponds to a hydrogen absorption of 1.11 moles per mole of caprolactone. The reaction product is removed from the autoclave with the aid of hot methanol, catalyst filtered off and solvent evaporated. Distillation of the viscous residue affords a trace of aqueous foreshots and then 3 fractions—

(1) 1.45 parts of material B.P. 90–125° C./16 mm., a colourless oil which crystallises on keeping, (2) 1.36 parts of material B.P. 125–139° C./16 mm., a colourless oil, 7.71 parts of material B.P. 139–144° C./16 mm., a colourless oil which crystallises on cooling; the involatile distillation residue is a mobile green-coloured oil (12.37 parts).

Fraction 1 is essentially hexamethylene diamine containing a little $\epsilon$-caprolactam.

Fraction 2 is a mixture of hexamethylene diamine and caprolactam.

Fraction 3 is $\epsilon$-caprolactam, M.P. 56–59° C.

Paper chromatographic examination of the product from acid hydrolysis of the distillation residue, shows the latter to be low molecular weight polycaprolactam.

*Example 4*

The procedure of Example 1 is repeated with the following quantities of reactants: 37.5 parts of $\epsilon$-caprolactone, 300 parts of anhydrous ammonia, 8 parts of Raney nickel catalyst, and a total initial ammonia plus hydrogen pressure of 97 atmospheres. The heating period is 12 hours at 225° C. and the maximum pressure developed is 389 atmospheres. The final pressure of 90 atmospheres in the cooled autoclave corresponds to a hydrogen absorption of 1.02 moles per mole of caprolactone charged. The reaction product is removed from the autoclave with the aid of hot methanol, catalyst is filtered off and solvent evaporated. Distillation of the viscous residue affords 3 fractions—

(1) 1.57 parts of material B.P. 104–120° C./13.5 mm., a colourless oil which crystallises on keeping, (2) 0.98 parts of material B.P. 120–137° C./13.5 mm., a colourless oil, (3) 12.05 parts of material B.P. 137–141° C./13.5 mm,. a colourless oil which crystallises on cooling; the involatile distillation residue is a viscous green-coloured oil (19.70 parts).

Fraction 1 is essentially hexamethylene diamine containing a little $\epsilon$-caprolactam.

Fraction 2 is a mixture of hexamethylene diamine and $\epsilon$-caprolactam.

Fraction 3 is caprolactam, M.P. 53–54° C.

Paper chromatographic examination of the product from acid hydrolysis of the distillation residue shows the latter to be low molecular weight polycaprolactam.

*Example 5*

The same quantities of reactants are used as in Example 1 but the temperature of the agitated reaction mixture is raised to 272° C. and maintained at this level for 8½ hours when a maximum pressure of 270 atmospheres is developed. When the autoclave then is cooled to room temperature, the final total pressure is found to be 78 atmospheres corresponding to a hydrogen absorption of 1.02 moles per mole of caprolactone charged. The reaction product is removed from the autoclave with the aid of hot methanol, catalyst is filtered off and solvent evaporated. Distillation of the viscous residue affords 4 fractions—

(1) 2.83 parts of material B.P. 20–58° C./25 mm., a colourless oil, (2) 1.68 parts of material B.P. 58–120° C./18 mm., a colourless oil, (3) 0.74 part of material B.P. 120–138° C./18 mm., a colourless oil which partly crystallises on keeping, (4) 5.03 parts of material B.P. 138–144° C./18 mm., and then 92° C./0.1 mm.–110° C./0.30 mm. a colourless oil which crystallises on cooling; the involatile distillation residue is a viscous green mass (48.53 parts).

Fraction 1 is largely water containing small amounts of hexamethylenediamine and hexamethylene imine.

Fraction 2 contains hexamethylenediamine and hexamethylene imine.

Fraction 3 contains hexamethylenediamine, hexamethyene imine and $\epsilon$-caprolactam.

Fraction 4 is $\epsilon$-caprolactam M.P. 53–56° C.

The involatile distillation residue is essentially low molecular weight polycaprolactam.

*Example 6*

The procedure of Example 2 is repeated except that $\gamma$-butyrolactone replaces $\epsilon$-caprolactone. The product consists of 50.4 parts of $\gamma$-butyrolactan, B.P. 134–136° C./19 mm., accompanied by only a very little polymeric material.

What we claim is:

1. In a process for the manufacture of mixtures of lactams with the corresponding polyamides by reacting a lactone containing from 4–8 carbon atoms with a nitrogenous compound selected from the class consisting of ammonia and amine in the presence of hydrogen and a hydrogenation catalyst at elevated pressure and termperature, the improvement comprising: reacting at least 15 molecular proportions of said nitrogenous compound with each molecular proportion of lactone at a pressure from about 50 to about 1,000 atmospheres.

2. In a process for the manufacture of mixtures of lactams with the corresponding polyamides by reacting a latcone containing from 5 to 8 carbon atoms with a nitrogenous compound selected from the class consisting of ammonia and amine in the presence of hydrogen and a hydrogenation catalyst at elevated pressure and temperature, the improvement comprising: reacting at least 15 molecular proportions of said nitrogenous compound with each molecular proportion of lactone.

3. A process according to claim 2 wherein the lactone is caprolactone.

4. A process according to claim 1 wherein the molar ratio of lactone to the nitrogenous compound is from 1:15 to about 1:250.

5. A process according to claim 1 wherein the temperature is from about 200° to about 350° C.

6. A process according to claim 1 wherein the nitrogenous compound is an amine selected from the group consisting of an aliphatic amine, a cycloaliphatic amine, an aromatic amine, and an arylalkylamine containing from 1 to 8 carbon atoms.

7. A process according to claim 1 wherein hydrogen is employed in an amount of from about 0.1 to about 3 mols for each mol of ammonia.

8. A process according to claim 1 wherein the polyamide is hydrolyzed and an amino acid corresponding to the lactam is recovered from the hydrolysis product by absorption on an ion exchange resin.

References Cited

UNITED STATES PATENTS

| | | | |
|---|---|---|---|
| 2,817,646 | 12/1957 | Payne | 260—239.3 |
| 2,828,307 | 3/1958 | Sowterbroek et al. | 260—239.3 |
| 3,000,880 | 9/1961 | Phillips et al. | 260—239.3 |

WALTER A. MODANCE, *Primary Examiner.*

R. T. BOND, *Assistant Examiner.*